United States Patent
Jäger

[11] Patent Number: 5,888,144
[45] Date of Patent: Mar. 30, 1999

[54] PLASTIC BOWLING PIN AND METHOD FOR ITS MANUFACTURE

[75] Inventor: Claudius Jäger, Lafayette, Colo.

[73] Assignee: Arnold Jäger, Burgdorf, Germany

[21] Appl. No.: 861,447

[22] Filed: May 22, 1997

[30] Foreign Application Priority Data

Jul. 13, 1996 [DE] Germany .................. 196 28 301.9

[51] Int. Cl.⁶ ..................................................... A63D 9/00

[52] U.S. Cl. ........................................... 473/118; 473/124

[58] Field of Search ................. 473/118–124, 85

[56] References Cited

U.S. PATENT DOCUMENTS

| | | |
|---|---|---|
| 1,190,649 | 7/1916 | Hedenskoog. |
| 3,240,494 | 3/1966 | Conklin et al. .................. 473/121 |
| 3,251,598 | 5/1966 | Craig et al. ...................... 473/119 |
| 5,660,596 | 8/1997 | Rochefort ......................... 473/148 |

Primary Examiner—William M. Pierce
Attorney, Agent, or Firm—Robert W. Becker & Associates

[57] ABSTRACT

A bowling pin has a pin body with a head and a magnet, at least partially enclosed in a plastic envelope, positioned in the head for manipulating the bowling pin. The plastic envelope and the head are fused to one another by rotating the plastic envelope within a cutout of the head so that the contact surfaces are heated for softening and fusing the material.

8 Claims, 1 Drawing Sheet

PLASTIC BOWLING PIN AND METHOD FOR ITS MANUFACTURE

BACKGROUND OF THE INVENTION

The present invention relates to a plastic bowling pin with a magnet embedded in its head for manipulating the bowling pin, for example, for positioning the bowling pin on the bowling alley, whereby the magnet is entirely or partly embedded in plastic and the plastic envelope is fixedly connected to the pin body. This application relates to any type of pin for bowling or similar games.

Preferably, the present invention also relates to bowling pins which, within a hard shell comprised of plastic, contain a porous and/or foamed core which fills the shell entirely or only partly.

The present invention furthermore relates to a method for manufacturing the aforementioned bowling pin.

The magnet which is comprised of a solid material, for example, a permanent magnet, has the advantage that for most automated manipulations of the bowling pin it is very expedient, however, there is the risk that the magnet together with its envelope can separate from the pin body and is lost. This risk is present because, for attaching the plastic envelope, adhesives are used which are sometimes not able to withstand the loads acting on a bowling pin.

It is therefore an object of the present invention to embody the aforementioned bowling pin such that an accidental damaging of the bowling pin, i.e., separation of the magnet, is prevented.

SUMMARY OF THE INVENTION

The inventive bowling pin according to the present invention is primarily characterized by:

A pin body with a head;

A magnet, at least partially enclosed in a plastic envelope, positioned in the head for manipulating the bowling pin;

The plastic envelope and the head fused to one another.

Advantageously, the plastic envelope has a conical outer mantle surface. The head has a cutout with a conical circumferential wall surface for receiving the plastic envelope. The conical circumferential wall surface tapers inwardly relative to the pin body. The conical outer mantle surface and the conical circumferential wall surface match one another.

The plastic envelope preferably has receiving members for mounting the bowling pin on a rotation-imparting machine.

The receiving elements are preferably blind holes positioned between the magnet and the conical outer mantle surface. The blind holes open outwardly relative to the pin body.

In a preferred embodiment, three of the blind holes are circumferentially distributed in the plastic envelope.

The pin body comprises an outer shell. The wall thickness of the plastic envelope and the wall thickness of the outer shell are substantially identical.

The present invention also relates to a method for manufacturing the inventive bowling pin, whereby the method is characterized by the steps of:

Providing a cutout in the head of a pin body;

Inserting a plastic envelope, having a magnet at least partially enclosed in the plastic envelope, into the cutout;

Fusing the plastic envelope and the cutout to one another by rotating the plastic envelope and the cutout relative to one another to thereby heat contacting surfaces between the plastic envelope and the cutout for fusing.

The step of fusing may include pressing the plastic envelope into the cutout while rotating the plastic envelope and the cutout relative to one another.

The step of fusing may including pressing the plastic envelope into the cutout after rotating the plastic envelope and the cutout relative to one another.

According to the present invention, the plastic envelope enclosing the magnet and the shell of the bowling pin are fused to one another. Expediently, the contact surfaces to be connected by fusing of the envelope and of the cutout within the head of the bowling pin coincide on a conical surface that tapers toward the interior of the bowling pin.

Due to the inventive fusing (welding) of the plastic material, even extreme impact loads on the bowling pin cannot result in separation (loss) of the plastic envelope with the embedded magnet.

Bowling pins according to the inventive embodiment can be advantageously manufactured according to the present invention such that the bowling pin body, on the one hand, and the magnet with its plastic envelope, on the other hand, after the insertion of the envelope with its magnet into a cutout of the bowling pin body, are fused by a rotational movement relative to the rotational axis of the bowling pin body that causes the contact surfaces to be heated and subsequently fused to one another. The two parts may be advantageously pressed into one another in order to improve fusing. In order to be able to manipulate the magnet with its envelope more easily during fusing, the envelope at its outer side has one or more receiving elements in order to be able to grip, for example, with the chuck of a rotation-imparting machine such as a drill, rotate, and optionally press the plastic envelope into the cutout.

Preferably, the plastic envelope with the magnet is rotated while the pin body is stationary.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
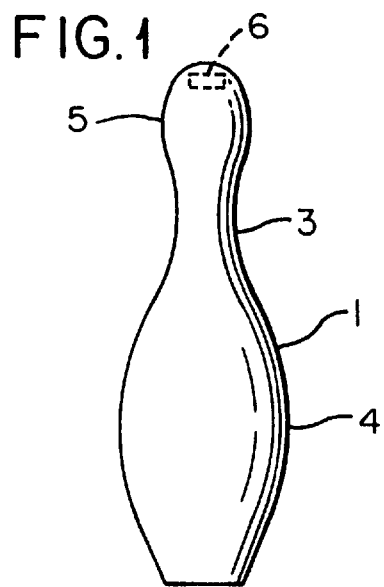
FIG. 1 shows a bowling pin in a side view.
Figure 2:
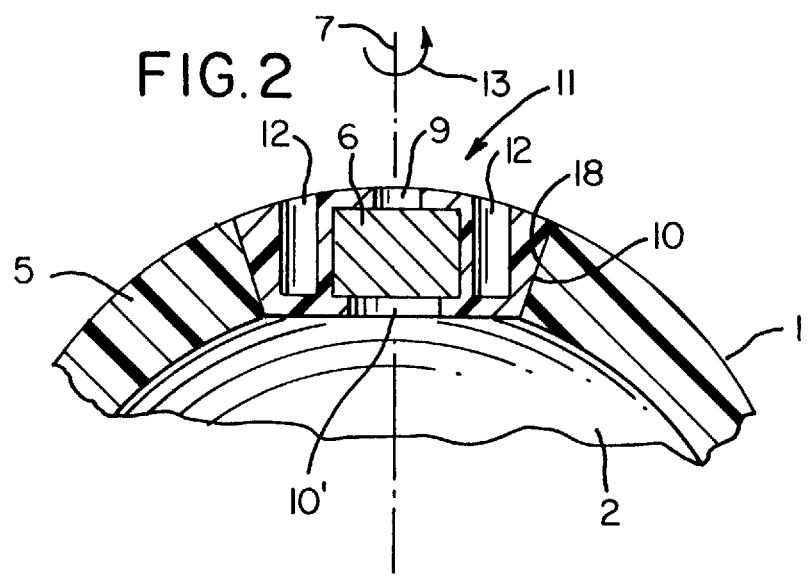
FIG. 2 shows a vertical part-sectional view of the head portion of the bowling pin of FIG. 1.
Figure 3:
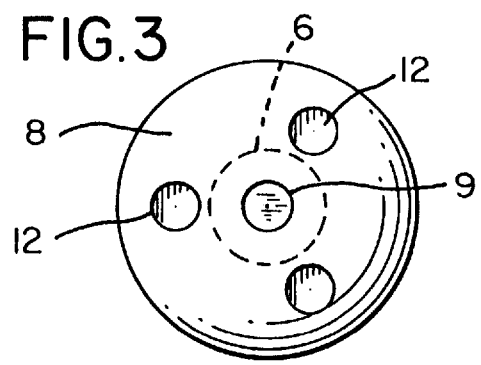
FIG. 3 shows the inventive envelope for the magnet in a plan view.

The present invention will now be described in detail with the aid of several specific embodiments utilizing FIGS. 1 through 3.

The shell 1 of the bowling pin is comprised of a tenacious, hard thermal plastic material and encloses a hollow interior 2 which has a porous or foamed core filling the hollow interior 2 entirely or partly. In order to be able to use the bowling pin in automated positioning devices, above the neck 3 and the barrel portion 4 of the pin body a magnet 6 in the form of a permanent magnet is provided at the uppermost location of the head 5. The magnet 6 has the shape of a short cylinder and its axis of rotation coincides with the axis of rotation 7 of the bowling pin.

The magnet 6 is centrally embedded in envelope 8 which has at the top and at the bottom an opening 9, 10 so that the magnet 6 is primarily positive-lockingly engaged at its outer circumference. The outer mantle surface 18 of the envelope 8 is of a conical shape. It rests at a conical circumferential wall surface 10 of a matching conically designed cutout 11 of the head 5. Between the conical circumferential wall surface 10 and the magnet 6, three uniformly circumferentially distributed blind holes 12 are provided which are open at the top of the bowling pin and which extend parallel to the axis of rotation 7.

The magnet 6 and the plastic envelope 8 are manufactured in a separate manufacturing step in order to thus form a closed unit having a thickness that corresponds substantially to the wall thickness of the shell 1. The envelope 8 is comprised of a tenacious, hard thermoplastic material, like the shell 1.

In order to connect the plastic envelope 8 with the magnet 6 to the shell 1, the plastic envelope with magnet 6 is inserted into the cutout 11 and, by using the receiving elements (blind holes) 12, are connected rotationally fixedly to the receiving unit of a rotation-imparting machine, for example, the chuck of a drill. The envelope 8 with magnet 6 is then rotated in the direction of arrow 13 while the bowling pin body is stationary in order to thus cause heating in the area of the surfaces 18, 10 to such an extent that first a softening of the material and subsequently a fusing of the envelope 8 to the shell 1 occurs. During rotation, or subsequent thereto, the envelope 8 can be pressed in the direction of rotational axis 7 into the cutout in order to improve fusing. Due to the performed rotation, a sufficiently large frictional heat results which even causes small amounts of material to be squeezed out at the seams, which can be removed easily after cooling. Accordingly, with the inventive method it is even possible to monitor the fusing action.

Optionally, the blind holes 12, after fusing of the magnet 6 to the head, can be closed or filled with a suitable material.

The present invention is, of course, in no way restricted to the specific disclosure of the specification and drawings, but also encompasses any modifications within the scope of the appended claims.

What I claim is:

1. A bowling pin comprising:

a pin body with a head;

a magnet, at least partially enclosed in a plastic envelope, positioned in said head for manipulating said bowling pin;

said plastic envelope and said head fused to one another; said plastic envelope having receiving elements for mounting on a rotation-imparting machine.

2. A bowling pin according to claim 1, wherein:

said plastic envelope has a conical outer mantle surface;

said head has a cutout with a conical circumferential wall surface for receiving said plastic envelope;

said conical circumferential wall surface tapers inwardly relative to said pin body;

said conical outer mantle surface and said conical circumferential wall surface match one another.

3. A bowling pin according to claim 1, wherein said receiving elements are blind holes positioned between said magnet and said conical outer mantle surface and wherein said blind holes open outwardly relative to said pin body.

4. A bowling pin according to claim 3, wherein three of said blind holes are circumferentially distributed in said plastic envelope.

5. A bowling pin according to claim 1, wherein said pin body comprises an outer shell and wherein a wall thickness of said plastic envelope and a wall thickness of said outer shell are substantially identical.

6. A method for manufacturing a bowling pin with a head and a magnet, wherein the magnet is at least partially enclosed in a plastic envelope and positioned in the head for manipulating the bowling pin, wherein the plastic envelope and the head are fused to one another, said method comprising the steps of:

providing a cutout in the head of a pin body;

inserting a plastic envelope, having a magnet at least partially enclosed in the plastic envelope and having receiving elements, into the cutout;

engaging the receiving elements by a rotation-imparting machine;

fusing the plastic envelope and the cutout to one another by rotating the plastic envelope and the cutout relative to one another to thereby heat contacting surfaces between the plastic envelope and the cutout for fusing.

7. A method according to claim 6, wherein said step of fusing includes pressing the plastic envelope into the cutout while rotating the plastic envelope and the cutout relative to one another.

8. A method according to claim 6, wherein said step of fusing includes pressing the plastic envelope into the cutout after rotating the plastic envelope and the cutout relative to one another.

* * * * *